United States Patent
Kawamoto et al.

(10) Patent No.: US 8,518,584 B2
(45) Date of Patent: Aug. 27, 2013

(54) PRODUCTION METHOD FOR ELECTRODE FOR BATTERY, ELECTRODE PRODUCED BY PRODUCTION METHOD, AND BATTERY INCLUDING ELECTRODE

(75) Inventors: Koji Kawamoto, Aichi-ken (JP); Masato Hozumi, Susono (JP); Yoshio Sakka, Tsukuba (JP); Tetsuo Uchikoshi, Tsukuba (JP); Tohru Suzuki, Tsukuba (JP); Hideto Yamada, Tsukuba (JP)

(73) Assignees: Toyota Jidosha Kabushiki Kaisha, Toyota (JP); National Institute for Materials Science, Ibaraki (JP)

( * ) Notice: Subject to any disclaimer, the term of this patent is extended or adjusted under 35 U.S.C. 154(b) by 103 days.

(21) Appl. No.: 13/020,257

(22) Filed: Feb. 3, 2011

(65) Prior Publication Data

US 2011/0195310 A1 Aug. 11, 2011

(30) Foreign Application Priority Data

Feb. 5, 2010 (JP) ................................ 2010-024592

(51) Int. Cl.
*H01M 4/13* (2010.01)
(52) U.S. Cl.
USPC ............... 429/231.3; 429/209; 429/218.1; 429/231.95
(58) Field of Classification Search
USPC .................... 429/209, 218.1, 231.3
See application file for complete search history.

(56) References Cited

U.S. PATENT DOCUMENTS

| | | | | |
|---|---|---|---|---|
| 2001/0031398 A1* | 10/2001 | Hashimoto et al. | ........ | 429/218.1 |
| 2004/0072076 A1* | 4/2004 | Matsubara et al. | ........ | 429/231.8 |
| 2005/0213187 A1* | 9/2005 | Leddy et al. | .................. | 359/265 |
| 2009/0242849 A1* | 10/2009 | Sudoh et al. | .................. | 252/502 |

FOREIGN PATENT DOCUMENTS

| | | |
|---|---|---|
| CN | 1520621 A | 8/2004 |
| JP | A-11-7942 | 1/1999 |
| JP | A-2002-279985 | 9/2002 |
| JP | A-2003-132887 | 5/2003 |
| JP | A-2006-127823 | 5/2006 |
| JP | A-2007-173210 | 7/2007 |
| JP | A-2009-227923 | 10/2009 |
| JP | A-2009-295514 | 12/2009 |

OTHER PUBLICATIONS

Office Action issued in Japanese Patent Application No. 2010-024592 dated May 25, 2012 (with partial translation).
Aug. 28, 2012 Office Action issued in Japan Patent Application No. 2010-024592 (with English translation).
Apr. 11, 2013 Chinese Office Action issued in Chinese Application No. 201110036455.5 with English-language translation.

* cited by examiner

*Primary Examiner* — Patrick Ryan
*Assistant Examiner* — Ben Lewis
(74) *Attorney, Agent, or Firm* — Oliff & Berridge, PLC

(57) ABSTRACT

A production method for an electrode for a battery includes preparing a conductive substrate, and electrode material particles having ion conduction anisotropy; and producing an electrode by attaching the electrode material particles onto the conductive substrate, and applying a magnetic field in a predetermined direction.

4 Claims, 3 Drawing Sheets

PRODUCTION METHOD FOR ELECTRODE FOR BATTERY, ELECTRODE PRODUCED BY PRODUCTION METHOD, AND BATTERY INCLUDING ELECTRODE

INCORPORATION BY REFERENCE

The disclosure of Japanese Patent Application No. 2010-024592 filed on Feb. 5, 2010 including the specification, drawings and abstract is incorporated herein by reference in its entirety.

BACKGROUND OF THE INVENTION

1. Field of the Invention

The invention relates to a production method for an electrode for a battery, an electrode produced by the production method, and a battery including the electrode.

2. Description of the Related Art

In a secondary battery, a portion of chemical energy is converted to electric energy due to a chemical reaction. Thus, electricity is discharged from the secondary battery. In addition, when current flows in a direction opposite to a direction in which current flows at the time of electric discharge, electric energy is converted to chemical energy, and stored in the secondary battery (that is, the secondary battery is charged). Among secondary batteries, a lithium secondary battery is widely employed as power sources of, for example, a notebook-sized personal computer and a cellular phone, because the lithium secondary battery has high energy density.

In the lithium secondary battery, when graphite ($C_6$) is used as a negative electrode active material, a reaction represented by a formula (1) proceeds at a negative electrode at the time of electric discharge.

$$C_6Li \rightarrow C_6 + Li^+ + e^- \qquad (1)$$

Electrons generated in the formula (1) flow through an external circuit, and perform work on an external load, and then, reaches a positive electrode. Lithium ions ($Li^+$) generated in the formula (1) move in an electrolyte held between the negative electrode and the positive electrode, from the negative electrode to the positive electrode due to electro-osmosis.

When lithium cobaltate ($Li_{0.4}CoO_2$) is used as the positive electrode active material, a reaction represented by a formula (2) proceeds at the positive electrode at the time of electric discharge.

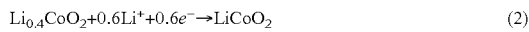

$$Li_{0.4}CoO_2 + 0.6Li^+ + 0.6e^- \rightarrow LiCoO_2 \qquad (2)$$

At the time of electric charge, a reverse reaction opposite to the reaction represented by the formula (1) proceeds at the negative electrode, and a reverse reaction opposite to the reaction represented by the formula (2) proceeds at the positive electrode. At the negative electrode, the graphite ($C_6Li$), into which the lithium ions have moved due to graphite intercalation, is recovered. At the positive electrode, lithium cobaltate ($Li_{0.4}CoO_2$) is recovered. Thus, the lithium secondary battery is able to discharge.

It is known that in a conventional solid lithium secondary battery, when a thin film of $LiCoO_2$, which is used as the positive electrode active material, is produced, there is a strong tendency of the c-axis orientation (that is, the (003) plane orientation), and therefore, Li ions are not smoothly transmitted between the positive electrode active material and a solid electrolyte, and as a result, the output current of the all-solid lithium secondary battery is decreased. In order to solve the problem, Japanese Patent Application Publication No. 2003-132887 (JP-A-2003-132887) describes a technology regarding a solid lithium secondary battery, as a technology in which the c-axes of lithium cobaltate crystals are inclined with respect to the normal line of a substrate. In the solid lithium secondary battery, a positive electrode active material layer made of $LiCoO_2$, an electrolyte layer, and a negative electrode active material layer are sequentially formed on a conductive substrate. The c-axes of the crystals of the positive electrode active material $LiCoO_2$ are inclined at an angle of at least 60° with respect to the normal line of the substrate.

In the publication No. 2003-132887, a layer of $LiCoO_2$, which is the positive electrode active material, is formed on the conductive substrate by the gas phase film forming method, as described in the paragraph 6 in the publication. However, when employing the gas phase film forming method, it is difficult to set the thickness of the positive electrode active material layer to a large thickness. Accordingly, when producing a battery in which the positive electrode active material layer has a large thickness, that is, when producing a battery with a high discharge characteristic, the gas phase film forming method is not practical.

SUMMARY OF THE INVENTION

The invention provides a production method for an electrode for a battery, an electrode produced by the production method, and a battery including the electrode.

A first aspect of the invention relates to a production method for an electrode for a battery. The production method includes preparing a conductive substrate, and electrode material particles having ion conduction anisotropy; and producing an electrode by attaching the electrode material particles onto the conductive substrate, and applying a magnetic field in a predetermined direction.

In the production method according to the above-described aspect, the directions, in which the electrode material particles are oriented, are controlled, and thus, crystals in the electrode material particles are oriented in a direction in which ions and electrons are easily conducted. As a result, it is possible to improve the discharge characteristic of a battery using an electrode for a battery produced by the production method.

In the production method according to the first aspect, an intensity of the magnetic field may be equal to or higher than 0.5 T.

In the production method according to the above-described aspect, the crystals in the electrode material particles are oriented in the same direction, by applying the magnetic field with a sufficiently high intensity.

In the production method according to the first aspect, an aspect ratio of each of the electrode material particles may be equal to or higher than 1.0 and lower than 5.0.

In the production method according to the above-described aspect, each of the electrode material particles has an appropriate aspect ratio. Therefore, when the electrode material particles are rotated, a gap is not generated between the particles. As a result, it is possible to reduce the possibility that a crack occurs in the produced electrode.

In the production method according to the first aspect, the electrode material particles may be lithium cobaltate particles.

In the production method according to the first aspect, in producing the electrode, after the electrode material particles are dispersed in a dispersion medium, the dispersion medium, in which the electrode material particles are dispersed, may be applied to the conductive substrate so that the electrode material particles are attached onto the conductive substrate.

A second aspect of the invention relates to an electrode for a battery produced by the production method according to the first aspect.

A third aspect of the invention relates to a battery. The battery includes a positive electrode; a negative electrode; and an electrolyte provided between the positive electrode and the negative electrode. At least one of the positive electrode and the negative electrode includes the electrode for a battery according to the second aspect.

According to the above-described aspects of the invention, the directions, in which the electrode material particles are oriented, are controlled, and thus, crystals in the electrode material particles are oriented in a direction in which ions and electrons are easily conducted. As a result, it is possible to improve the discharge characteristic of a battery using an electrode for a battery produced by the production method.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

1. Production Method for an Electrode for a Battery

A production method for an electrode for a battery in an embodiment of the invention includes preparing a conductive substrate, and electrode material particles having ion conduction anisotropy; and producing an electrode by attaching the electrode material particles onto the conductive substrate, and applying a magnetic field in a predetermined direction.

When employing the technology in which an active material layer is formed by the gas phase film forming method as described in the above Japanese Patent Application Publication No. 2003-132887, only active material particles can be oriented. For example, a composite material containing a material other than the active material cannot be used in the active material layer. Also, in the method in which the gas phase film forming method is used, a film is produced at a film forming rate of approximately 0.1 to 1 μ per one hour. Therefore, the film is formed slowly, and it is difficult to form a film with a large thickness. Accordingly, when employing the method in related art, the capacity of a produced battery is small. Thus, the method in related art is not an industrial method.

Figure 6:
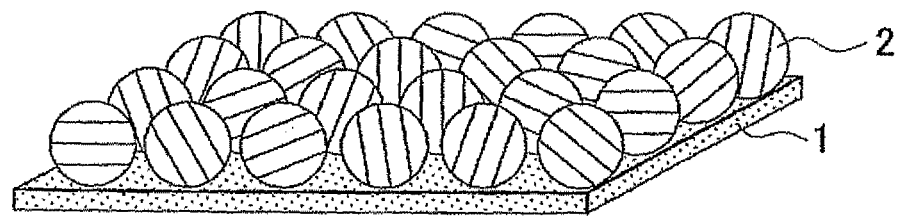
FIG. 6 is a schematic perspective view showing an electrode for a battery produced according to a method in related art.

In contrast to the gas phase film forming method, a method in which an electrode for a battery is produced by an application method is known as a method that makes it possible to produce a film with a large thickness. FIG. 6 is a schematic perspective view showing an electrode for a battery produced by an application method in related art. In FIG. 6, the size of electrode material particles 2 on a conductive substrate 1 is exaggeratingly large. Also, in FIG. 6, the direction of stripes in a circle showing each electrode material particle 2 indicates a direction in which ion conductivity and electron conductivity are high. In the electrode material particles 2 attached onto the conductive substrate 1 by the application method in related art, crystals are oriented in random directions. Therefore, as shown in FIG. 6, the directions in which the ion conductivity and the electron conductivity are high in the electrode material particles 2 are not necessarily the same.

Figure 1:
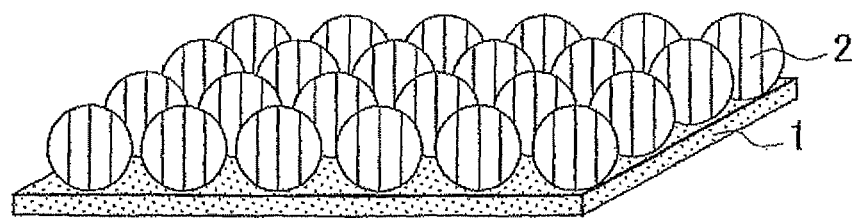
FIG. 1 is a schematic perspective view showing an electrode for a battery produced according to a production method in an embodiment of the invention.

FIG. 1 is a schematic perspective view showing an electrode for a battery produced by a production method in the embodiment of the invention. In FIG. 1, the size of the electrode material particles 2 is exaggeratingly large, and the direction of stripes in the circle showing each electrode material particle 2 indicates the direction in which ion conductivity and electron conductivity are high, as in FIG. 6. In the embodiment of the invention, the directions, in which the electrode material particles 2 on the conductive substrate 1 are oriented, are controlled by applying the magnetic field. Thus, the crystals in the electrode material particles 2 are oriented in the direction in which ions and electrons are easily conducted. As a result, it is possible to improve the discharge characteristic of a battery using the electrode for a battery produced by the production method in the embodiment of the invention, as compared to a battery using the electrode in which the crystals are oriented in random directions.

In the embodiment of the invention, the direction of the magnetic field applied to the electrode material particles may be appropriately determined taking into account, for example, the manner in which the electrode material particles are oriented with respect to the magnetic field, and the direction in which ions and electrons are easily conducted in the electrode material particles. Hereinafter, an example in which $LiCoO_2$ particles are used as the elect/ode material particles will be examined. $LiCoO_2$ has such a property that the (003) plane is oriented in a direction perpendicular to the magnetic field. On the other hand, $LiCoO_2$ has such a property that ions and electrons are conducted slowly in a direction perpendicular to the (003) plane. Accordingly, when the electrode for a battery is produced using $LiCoO_2$ in the embodiment of the invention, the magnetic field is applied in a direction that is relatively unrelated, to ion conduction and electron conduction, that is, a direction substantially parallel to the conductive substrate. Thus, the crystal direction, in which ions and electrons are quickly conducted, extends in the direction substantially perpendicular to the conductive substrate.

Taking into account that the crystals in the electrode material particles are oriented in the same direction by applying the magnetic field with a sufficiently high intensity, it is preferable that the intensity of the magnetic field applied to the electrode material particles should be equal to or higher than 0.5 T. If the intensity of the magnetic field is lower than 0.5 T, it is not possible to achieve the degree of orientation in the electrode material particles, which is sufficiently high for improving the discharge characteristic of the battery. It has been found that when the $LiCoO_2$ particles are used as the electrode material particles as in examples described below, the orientation degree of 70% is achieved at the magnetic field intensity of 12 T. In the embodiment of the invention, the intensity of the magnetic field applied to the electrode material particles is preferably equal to or higher than 1 T, and more preferably, equal to or higher than 2 T.

Figure 7A:
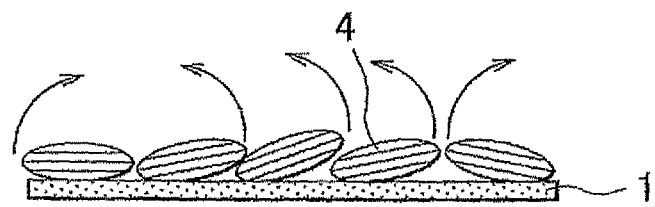
FIGS. 7A and 7B are schematic sectional views showing an electrode for a battery before and after a magnetic field is applied, in the case where scale-shaped electrode material particles with a relatively high aspect ratio are used.
Figure 7B:
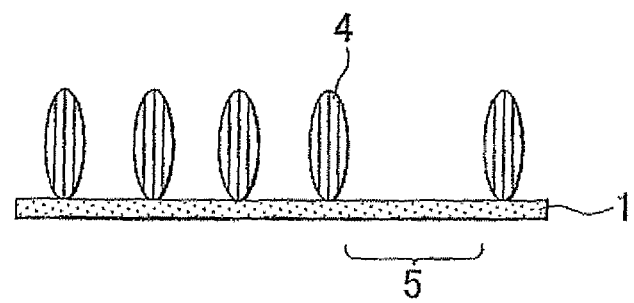

It is preferable that the aspect ratio of each of the electrode material particles used in the embodiment of the invention should be equal to or higher than 1.0 and lower than 5.0. FIGS. 7A and 7B are schematic sectional views showing an electrode for a battery before and after the magnetic field is applied, in the case where scale-shaped electrode material particles with a relatively high aspect ratio are used. In FIGS. 7A and 7B, the size of electrode material particles 4 on the conductive substrate 1 is exaggeratingly large. Also, in FIGS. 7A and 7B, the direction of stripes in an ellipse showing each scale-shaped electrode material particle 4 indicates the direction in which ion conductivity and electron conductivity are high. By applying the magnetic field, the stripes are oriented in the direction substantially perpendicular to the substrate. FIG. 7A is a diagram showing the electrode for a battery immediately before the magnetic field is applied. As shown in FIG. 7A, the scale-shaped electrode material particles 4 are attached onto the conductive substrate 1, and most of the particles 4 are attached onto the conductive substrate 1 in a manner such that the particles 4 are disposed in substantially parallel to the conductive substrate 1. Arrows in FIG. 7A show directions in which the particles 4 are rotated to rise up. FIG. 7B is a diagram showing the electrode for a battery after the magnetic field is applied. As shown in FIG. 7B, a gap 5 is generated in the electrode as a result of applying the magnetic field so that the particles 4 are rotated to rise up. Because of the gap 5 between the particles 4, the contraction force of binder (not shown) is uneven at the time of drying. As a result, a crack occurs in the electrode.

Figure 2A:
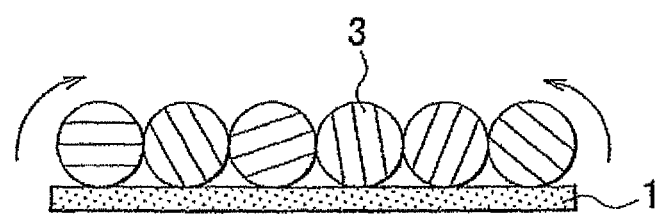
FIGS. 2A and 2B are schematic sectional views showing an electrode for a battery before and after a magnetic field is applied, in the case where spherical electrode material particles with a relatively low aspect ratio are used.
Figure 2B:
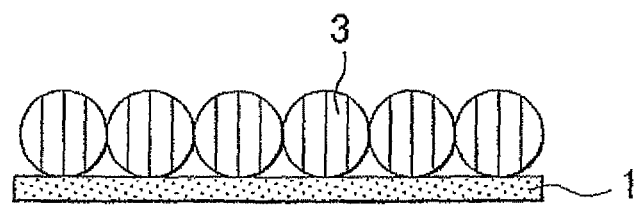

FIGS. 2A and 2B are schematic sectional views showing an electrode for a battery before and after the magnetic field is applied, in the case where spherical electrode material particles with a relatively low aspect ratio are used. In FIGS. 2A and 2B, the size of electrode material particles 3 on the conductive substrate 1 is exaggeratingly large. In FIGS. 2A and 2B, the direction of stripes in a circle showing each electrode material particle 3 indicates the direction in which ion conductivity and electron conductivity are high. By applying the magnetic field, the stripes are oriented in the direction substantially perpendicular to the substrate. FIG. 2A is a diagram showing the electrode for a battery immediately before the magnetic field is applied. As shown in FIG. 2A, the spherical electrode material particles 3 are attached onto the conductive substrate 1. Arrows in FIG. 2A indicates directions in which the particles 3 are rotated when the magnetic field is applied. FIG. 2B is a diagram showing the electrode for a battery after the magnetic field is applied. As shown in FIG. 2B, in the case where the spherical electrode material particles with a relatively low aspect ratio are used, a gap is not generated between the electrode material particles when the electrode material particles are rotated, and as a result, a crack is not generated in the produced electrode, unlike the case where the scale-shaped electrode material particles are used. It is particularly preferable that the aspect ratio of each electrode material particle used in the embodiment of the invention should be 1.0 to 2.5.

The electrode material particles used in the embodiment of the invention are not limited to specific electrode material particles, as long as the electrode material particles have ion conduction anisotropy. The electrode material particles used in the embodiment of the invention vary depending on whether the electrode for a battery produced by the production method in the embodiment of the invention is used as the positive electrode of a battery or the negative electrode of a battery. More specifically, examples of the electrode material particles used in the embodiment of the invention, which serve as the positive electrode active material of the positive electrode of the battery, include $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$, $LiFePO_4$, and $Li_3V_2(PO_4)_3$. The electrode material particles used in the embodiment of the invention, which serve as the negative electrode material of the negative electrode of the battery, are not limited to specific electrode material particles, as long as the electrode material particles can store and release lithium ions. Examples of the electrode material particles used in the embodiment of the invention, which serve as the negative electrode material of the negative electrode of the battery, include metal lithium, lithium alloy, metal oxide, metal sulfide, metal nitride, and carbon materials such as graphite. The negative active material may be in the form of powder or a thin film. For example, $LiCoO_2$ among them has a layered structure. $LiCoO_2$ has such a property that lithium ions and electrons are quickly conducted in a direction perpendicular to the (104) plane, and lithium ions and electrons are slowly conducted in a direction perpendicular to the (003) plane. In the case where the $LiCoO_2$ particles are used as the electrode material particles in the embodiment of the invention, it is possible to improve the discharge characteristic of the battery by orienting the crystals in the direction in which Li ions and electrons are easily conducted, that is the direction perpendicular to the (104) plane.

The average diameter of the electrode material particles used in the embodiment of the invention is preferably in a range of 0.01 μm to 50 μm, more preferably in a range of 0.05 μm to 20 μm, and further more preferably in a range of 0.1 μm to 10 μm. If the average diameter of the electrode material particles is extremely small, it may be difficult to treat the electrode material particles. If the average diameter of the electrode material particles is extremely large, it may be difficult to produce a flat electrode active material layer. The average diameter of the electrode material particles is determined, for example, by measuring the diameters of particles of an active material carrier observed by a Scanning Electron Microscope (SEM), and averaging the diameters of the particles.

The conductive substrate used in the embodiment of the invention varies depending on whether the electrode for a battery produced by the production method in the embodiment of the invention is used as the positive electrode of a battery or the negative electrode of a battery. Examples of the material of the conductive substrate will be described in detail later in the description regarding "a positive electrode current collector" and "a negative electrode current collector".

Examples of the method of applying the magnetic field to the conductive substrate onto which the electrode material particles are attached include a method in which a superconducting magnet is used, a method in which the magnetic field is applied by arranging powerful magnets such as neodymium magnets, and a method in which the magnetic field is applied by arranging electromagnets.

In the production method for an electrode for a battery in the embodiment of the invention, in the step of producing the electrode, after the electrode material particles are dispersed in a dispersion medium, the dispersion medium, in which the electrode material particles are dispersed, may be applied to the conductive substrate so that the electrode material particles are attached onto the conductive substrate.

2. Electrode for Battery

The electrode for a battery in the embodiment of the invention is produced by the above-described production method for an electrode for a battery. A typical example, of the electrode for a battery in the embodiment of the invention is an electrode for a lithium secondary battery. Hereinafter, the ease where the electrode for a battery in the embodiment of the invention is used in the positive electrode of the lithium secondary battery, and the case where the electrode for a battery in the embodiment of the invention is used in the negative electrode of the lithium secondary battery will be described.

2-1. The Case where the Electrode for a Battery in the Embodiment of the Invention is Used in the Positive Electrode of the Lithium Secondary Battery The positive electrode of the lithium secondary battery in the embodiment of the invention includes the electrode for a battery produced by the production method in the embodiment of the invention. A layer in the electrode, which contains the electrode material particles, is a positive electrode active material layer, and the conductive substrate in the electrode is a positive electrode current collector. Preferably, the positive electrode of the lithium secondary battery in the embodiment of the invention includes a positive electrode lead connected to the conductive substrate. Hereinafter, the positive electrode active material layer and the positive electrode current collector will be described.

Positive Electrode Active Material Layer

The thickness of the positive electrode active material layer used in the embodiment of the invention varies depending on, for example, the intended purpose of the lithium secondary battery. However, the thickness of the positive electrode active material layer used in the embodiment of the invention is preferably in a range of 10 μm to 250 μm, more preferably in a range of 20 μm to 200 μm, and further more preferably in a range of 30 μm to 150 μm.

The positive electrode active material layer may contain a conductive material and a binding material as needed. The conductive material contained in the positive electrode active material layer used in the embodiment of the invention is not limited to a specific conductive material, as long as the conductive material improves the conductivity of the positive electrode active material layer. Examples of the conductive material include carbon black such as acetylene black and Ketjen black. The amount of the conductive material contained in the positive electrode active material layer varies depending on the type of the conductive material. However, the amount of the conductive material contained in the positive electrode active material layer is generally in a range of 1% by mass to 10% by mass.

Examples of the binding material contained in the positive electrode active material layer used in the embodiment of the invention include polyvinylidene fluoride (PVDF), polytetrafluoroethylene (PTFE), and a rubber particle binding agent. The amount of the binding material contained in the positive electrode active material layer may be set to any value, as long as the positive electrode active material and the like are immobilized by the binding material. A smaller amount of the binding material is more preferable. The amount of the binding material contained in the positive electrode active material layer is generally in a range of 1% by mass to 10% by mass.

Positive Electrode Current Collector

The positive electrode current collector used in the embodiment of the invention has a function of collecting current from the positive electrode active material layer. Examples of the material of the positive electrode current collector include aluminum, Stainless Used Steel (SUS), nickel, iron, and titanium. Aluminum and SUS are preferable materials among them. The positive electrode current collector may be in the forms of, for example, a foil, a plate, and a mesh. It is preferable that the positive electrode current collector should be in the form of a foil.

2-2. The Case where the Electrode for a Battery in the Embodiment of the Invention is Used in the Negative Electrode of the Lithium Secondary Battery The negative electrode of the lithium secondary battery in the embodiment of the invention includes the electrode for a battery produced by the production method in the embodiment of the invention. A layer in the electrode, which contains the electrode material particles, is a negative electrode active material layer, and the conductive substrate in the electrode is a negative electrode current collector. Preferably, the negative electrode of the lithium secondary battery in the embodiment of the invention includes a negative electrode lead connected to the conductive substrate. Hereinafter, the negative electrode active material layer and the negative electrode current collector will be described.

Negative Electrode Active Material Layer

The negative electrode active material layer may contain a conductive material and a binding material as needed. The materials that have been described in the description regarding the positive electrode active material layer may be used as the binding material and the conductive material in the negative electrode active material layer. It is preferable that the amounts of the used binding material and the used conductive material should be appropriately selected depending on, for example, the purpose of the lithium secondary battery. The thickness of the negative electrode active material layer is not limited to a specific thickness. The thickness of the negative electrode active material layer is, for example, in a range of 10 μm to 100 μm, and preferably in a range of 10 μm to 50 μm.

Negative Electrode Current Collector

The above-described materials, which may be used as the material of the positive electrode current collector, may be used as the material of the negative electrode current collector. In addition, copper may be used as the material of the negative electrode current collector. The same forms as the above-described forms of the positive electrode current collector may be employed as the form of the negative electrode current collector. The negative electrode in the embodiment of the invention is produced by the above-described production method for an electrode for a battery in the embodiment of the invention.

The electrode active material layer of at least one of the positive electrode and the negative electrode may contain at least the electrode active material and an electrolyte for an electrode. In this case, for example, electrolytes that will be described in detail later in the section "lithium ion conductive electrolyte" may be used as the electrolyte for an electrode.

The electrode for a battery in the embodiment of the invention is not necessarily limited to the above-described electrode for the lithium secondary battery. That is, the electrode for a battery in the embodiment of the invention includes any electrode for a battery, as long as the electrode, for a battery is produced by the above-described production method for an electrode for a battery.

3. Battery

The battery in the embodiment of the invention includes at least a positive electrode, a negative electrode, and an electrolyte provided between the positive electrode and the negative electrode. In the battery in the embodiment of the invention, at least one of the positive electrode and the negative electrode includes the above-described electrode for a battery.

Figure 5:
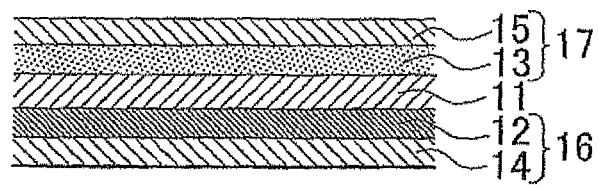
FIG. 5 is a diagram showing an example of a battery in the embodiment of the invention, and schematically showing a section of the battery taken along a direction in which layers are stacked.

FIG. 5 is a diagram showing an example of the battery in the embodiment of the invention, and is a schematic diagram showing a section of the battery taken along a direction in which layers are stacked. The battery in the embodiment of the invention is not necessarily limited to this example. Although FIG. 5 shows only the layered battery, a spiral-wound battery may be employed in addition to the layered battery. A battery 100 includes a positive electrode 16, a negative electrode 17, and an electrolyte 11 provided between the positive electrode 16 and the negative electrode 17. The positive electrode 16 includes a positive electrode active material layer 12 and a positive electrode current collector 14. The negative electrode 17 includes a negative electrode active material layer 13 and a negative electrode current collector 15. The battery 100 includes the above-described electrode for a battery in the embodiment of the invention, as at least one of the positive electrode and the negative electrode. A typical example of the battery in the embodiment of the invention is a lithium secondary battery. Hereinafter, other constituents of the lithium secondary battery, which is the typical example of the battery in the embodiment of the invention, will be described. That is, a lithium ion conductive electrolyte and other constituent elements (a separator and the like) will be described.

Lithium Ion Conductive Electrolyte

The lithium ion conductive electrolyte used in the embodiment of the invention is not limited to a specific electrolyte, as long as the electrolyte has lithium ion conductivity. The lithium ion conductive electrolyte may be solid or liquid. A polymer electrolyte and a gel electrolyte may be used. Specifically, for example, a solid oxide electrolyte and a solid sulfide electrolyte may be used as the lithium ion conductive solid electrolyte in the embodiment of the invention. Examples of the solid oxide electrolyte include LiPON (lithium phosphate oxynitride), $Li_{1.3}Al_{0.3}Ti_{0.7}(PO_4)_3$, $La_{0.51}Li_{0.34}Ti_{0.74}$, $Li_3PO_4$, $Li_2SiO_2$, $Li_2SiO_4$, $Li_{0.5}La_{0.5}TiO_3$, and $Li_{1.5}Al_{0.5}Ge_{1.5}(PO_4)_3$. Examples of the solid sulfide electrolyte include $Li_2S-P_2S_5$, $Li_2S-P_2S_3$, $Li_2S-P_2S_3-P_2S_5$, $Li_2S-SiS_2$, $LiI-Li_2S-P_2S_5$, $LiI-Li_2S-SiS_2-P_2S_5$, $Li_2S-SiS_2-Li_4SiO_4$, $Li_2S-SiS_2-Li_3PO_4$, $Li_3PS_4-Li_4GeS_4$, $Li_{3.4}P_{0.6}Si_{0.4}S_4Li_{3.25}P_{0.25}Ge_{0.76}S_4$, $Li_{4-x}Ge_{1-x}P_xS_4$, and $Li_7P_3S_{11}$.

Specifically, an aqueous electrolyte and a non-aqueous electrolyte may be used as the lithium ion conductive electrolyte in the embodiment of the invention. Water containing a lithium salt may be generally used as the aqueous electrolyte in the lithium secondary battery in the embodiment of the invention. Examples of the lithium salt include inorganic lithium salts such as $LiBF_4$, $LiClO_4$, and $LiAsF_6$; and organic lithium salts such as $LiCF_3SO_3$, $LiN(SO_2CF_3)_2$(Li-TFSI), $LiN(SO_2C_2F_5)_2$, and $LiC(SO_2CF_3)_3$. In the embodiment of the invention, the aqueous electrolyte may contain low-volatile liquid such as ionic liquid.

It is preferable to appropriately select the type of the non-aqueous electrolyte used in the embodiment of the invention, according to the type of metal ions to be conducted. For example, the non-aqueous electrolyte of the lithium secondary battery generally contains a lithium salt and a non-aqueous solvent. Examples of the lithium salt include inorganic lithium salts such as $LiPF_6$, $LiBF_4$, $LiClO_4$, and $LiAsF_6$; and organic lithium salts such as $LiCF_3SO_3$, $LiN(SO_2CF_3)_2$(Li-TFSI), $LiN(SO_2C_2F_5)_2$, and $LiC(SO_2CF_3)_3$. Examples of the non-aqueous solvent include ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile, 1,2-dimetoxymethane, 1,3-dimethoxypropane, diethyl ether, tetrahydrofuran, 2-methyl tetrahydrofuran, and mixtures of them. In order to efficiently use dissolved oxygen in reaction, it is preferable that the non-aqueous solvent should have high oxygen solubility. The concentration of the lithium salt in the non-aqueous electrolyte is, for example, in a range of 0.5 mol/L to 3 mol/L.

It is preferable that the polymer electrolyte used in the embodiment of the invention should contain a lithium salt and a polymer. The lithium salt is not limited to a specific lithium salt, as long as the lithium salt is used in an ordinary lithium secondary battery. Examples of the lithium salt include $LiPF_6$, $LiBF_4$, $LiN(CF_3SO_2)_2$, $LiCF_3SO_3$, $LiC_4F_9SO_3$, $LiC(CF_3SO_2)_3$, and $LiClO_4$. The polymer is not limited to a specific polymer, as long as the polymer and the lithium salt form a complex. An example of the polymer is polyethylene oxide.

It is preferable that the gel electrolyte used in the embodiment of the invention should contain a lithium salt, a polymer, and a non-aqueous solvent. As the lithium salt, the above-described lithium salts may be used. As the non-aqueous solvent, the above-described non-aqueous solvents may be used. One type of solvent may be used as the non-aqueous solvent, or a mixture of two or more types of solvents may be used as the non-aqueous solvent. Also, an ambient temperature molten salt may be used as the non-aqueous electrolyte. The polymer is not limited to a specific polymer, as long as the polymer can be brought into a gel state. Examples of the polymer include polyethylene oxide, polypropylene oxide, polyacryl nitryl, polyvinylidene fluoride (PVDF), polyurethane, polyacrylate, and cellulose.

Other Constituent Elements

The separator may be used in the battery in the embodiment of the invention, as the other constituent element. The separator is disposed between the above-described positive electrode current collector and the above-described negative electrode current collector. Generally, the separator has a function of preventing contact between the positive electrode active material layer and the negative electrode active material layer, and maintaining the solid electrolyte. Examples of the material of the separator include resins such as polyethylene (PE), polypropylene (PP), polyester, cellulose, and polyamide. Among them, polyethylene and polypropylene are preferable materials. The above-described separator may have a single layer structure, or a multi-layer structure. Examples of the separator with the multi-layer structure include a separator with a two-layer structure such as a PE/PP structure, and a separator with a three-layer structure such as a PP/PE/PP structure. Further, in the embodiment of the invention, the separator may be made of non-woven cloth such as non-woven resin cloth and non-woven glass fiber cloth. The thickness of the separator is not limited to a specific thickness. The thickness of the separator is similar to the thickness of a separator used in an ordinary lithium secondary battery.

The battery in the embodiment of the invention is not necessarily limited to the above-described lithium secondary battery. That is, the battery in the embodiment of the invention includes any battery that includes at least the positive electrode, the negative electrode, and the electrolyte provided in the positive electrode and the negative electrode.

EXAMPLES

1. Production of the Electrode for a Battery

First Example

LiCoO$_2$ (spherical particles, the aspect ratio: 1 to 2.5) that was a positive electrode active material, acetylene black that was a conductive material, a binder that was a binding agent were mixed at the mass ratio of 85:10:5 to produce a mixture. A positive electrode composite dispersion liquid was prepared by appropriately adding a dispersion medium to the mixture, and adjusting the viscosity. The dispersion liquid was applied to an aluminum foil that was a positive electrode current collector, and was dried in a strong magnetic field (12 T) using a superconducting magnet. The direction of the magnetic field was set to a direction parallel to the surface of the positive electrode current collector, and thus, the c-axis of LiCoO$_2$ was controlled to be disposed in a direction parallel to the surface of the positive electrode current collector. Thus, an electrode for a battery in a first example was produced.

Second Example

The positive electrode composite dispersion liquid was prepared in the same manner as the manner in which the positive electrode composite dispersion liquid was prepared in the first example. The dispersion liquid was applied to the aluminum foil that was the positive electrode current collector, and was dried in a strong magnetic field (8 T) using a superconducting magnet. The direction of the magnetic field was set to the direction parallel to the surface of the positive electrode current collector, and thus, the c-axis of LiCoO$_2$ was controlled to be disposed in the direction parallel to the surface of the positive electrode current collector. Thus, an electrode for a battery in a second example was produced.

Third Example

The positive electrode composite dispersion liquid was prepared in the same manner as the manner in which the positive electrode composite dispersion liquid was prepared in the first example. The dispersion liquid was applied to the aluminum foil that was the positive electrode current collector, and was dried in a strong magnetic field (4 T) using a superconducting magnet. The direction of the magnetic field was set to the direction parallel to the surface of the positive electrode current collector, and thus, the c-axis of LiCoO$_2$ was controlled to be disposed in the direction parallel to the surface of the positive electrode current collector. Thus, an electrode for a battery in a third example was produced.

Fourth Example

The positive electrode composite dispersion liquid was prepared in the same manner as the manner in which the positive electrode composite dispersion liquid was prepared in the first example. The dispersion liquid was applied to the aluminum foil that was the positive electrode current collector, and was dried in a strong magnetic field (2 T) using a superconducting magnet. The direction of the magnetic field was set to the direction parallel to the surface of the positive electrode current collector, and thus, the c-axis of LiCoO$_2$ was controlled to be disposed in the direction parallel to the surface of the positive electrode current collector. Thus, an electrode for a battery in a fourth example was produced.

Fifth Example

The positive electrode composite dispersion liquid was prepared in the same manner as the manner in which the positive electrode composite dispersion liquid was prepared in the first example. The dispersion liquid was applied' to the aluminum foil that was the positive electrode current collector, and was dried in a strong magnetic field (1 T) using a superconducting magnet. The direction of the magnetic field was set to the direction parallel to the surface of the positive electrode current collector, and thus, the c-axis of LiCoO$_2$ was controlled to be disposed in the direction parallel to the surface of the positive electrode current collector. Thus, an electrode for a battery in a fifth example was produced.

First Comparative Example

The positive electrode composite dispersion liquid was prepared in the same manner as the manner in which the positive electrode composite dispersion liquid was prepared in the first example. The dispersion liquid was applied to the aluminum foil that was the positive electrode current collector, and was dried in an environment where there was no magnetic filed. Thus, an electrode for a battery in a first comparative example was produced.

2. Production of a Coin Battery

Sixth Example

The electrode for a battery in the first example with a diameter of 16 mm was punched out, and was dried in vacuum during one night at 120° C. An Li metal foil with a diameter of 19 mm, which was a negative electrode active material, was punched out. A separator with a diameter of 16 mm was punched out, and was dried in vacuum at 60° C. A negative electrode can, a packing, the Li metal foil, the separator, an electrolyte solution, the positive electrode, and a positive electrode can were disposed in a glove box in the stated order, and swaging was performed using a crimping tool. Thus, a coin battery in a sixth example was produced.

Second Comparative Example

The electrode for a battery in the first comparative example with a diameter of 16 mm was punched out, and was dried in vacuum during one night at 120° C. An Li metal foil with a diameter, of 19 mm, which was a negative electrode active material, was punched out. A separator with a diameter of 16 mm was punched out, and was dried in vacuum at 60° C. A negative electrode can, a packing, the Li metal foil, the separator, an electrolyte solution, the positive electrode, and a positive electrode can were disposed in a glove box in the stated order, and swaging was performed using a crimping tool. Thus, a coin battery in a second comparative example was produced.

Third Comparative Example

LiCoO$_2$ (scale-shaped particles, the aspect ratio: 5 to 10) that was a positive electrode active material, acetylene black that was a conductive material, a binder that was a binding agent were mixed at the mass ratio of 85:10:5 to produce a mixture. A positive electrode composite dispersion liquid was prepared by appropriately adding a dispersion medium to the mixture, and adjusting the viscosity. The dispersion liquid was applied to an aluminum foil that was a positive electrode current collector, and was dried in a strong magnetic field (12

T) using a superconducting magnet. The direction of the magnetic field was set to a direction parallel to the surface of the positive electrode current collector, and thus, the c-axis of $LiCoO_2$ was controlled to be disposed in the direction parallel to the surface of the positive electrode current collector. Then, the aluminum foil, on which the positive electrode composite dispersion liquid was applied and dried, the Li metal foil that was the negative electrode active material, and the separator were shaped in the same manner as the manner in which they were shaped in the above-described sixth example. A negative electrode can, a packing, the Li metal foil, the separator, an electrolyte solution, the positive electrode, and a positive electrode can were disposed in a glove box in the stated order, and swaging was performed using a crimping tool. Thus, a coin battery in a third comparative example was produced.

3. XRD Measurement

The XRD patterns of the electrodes for batteries in the first to fifth examples, and the first comparative example were measured using a powder X-ray diffraction method, and a relation between the intensity of the magnetic field and the degree of orientation was examined. Detailed XRD measurement conditions and an analysis method are as follows. The radiation source was $CuK_\alpha$, the tube voltage was 35 kV, the tube current was 300 mA, and the analysis method was FT method.

Figure 3:
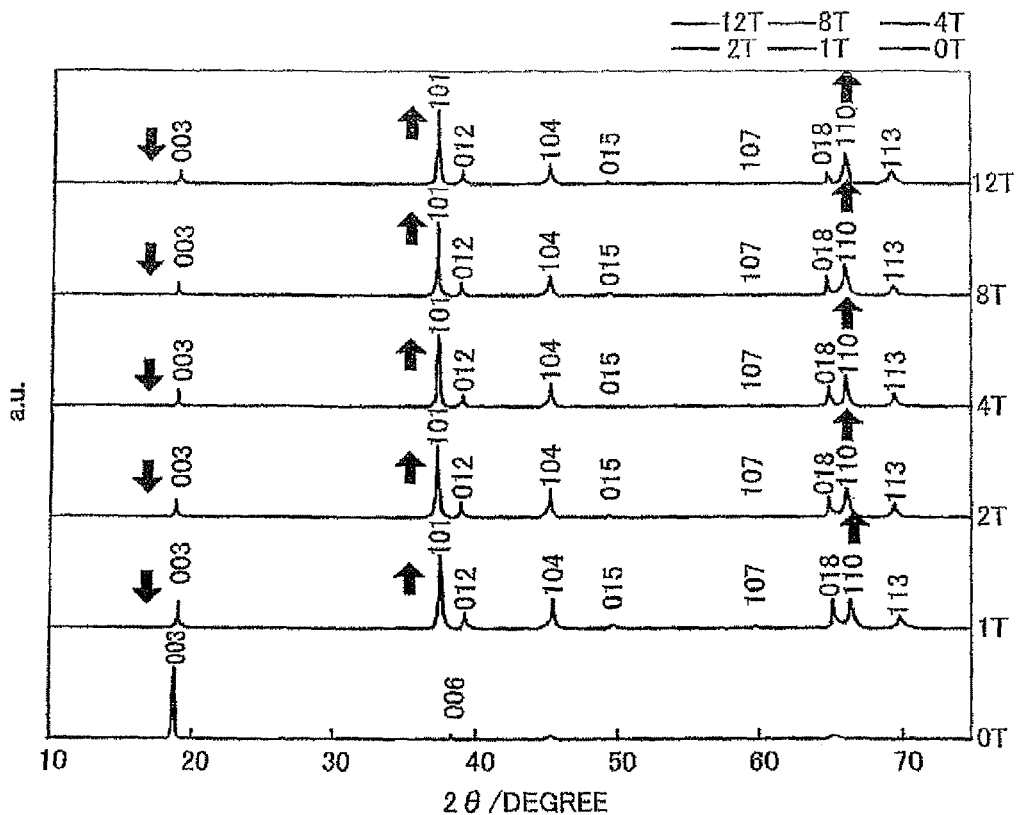
FIG. 3 is a diagram showing XRD patterns of electrodes for batteries in first to fifth examples and a first comparative example.

FIG. 3 is a diagram showing the XRD patterns of the electrodes for batteries in the first to fifth examples and the first comparative example. In FIG. 3, the XRD patterns of the electrodes for batteries in the first example, the second example, the third example, the fourth example, the fifth example, and the first comparative example are arranged in the stated order in a direction from an upper side toward a lower side in FIG. 3. As evident from FIG. 3, the intensity of the peak of the (003) plane of $LiCoO_2$ at 2θ of 19.0° decreased as the intensity of the magnetic field increased. In contrast, the intensity of the peak of the (101) plane of $LiCoO_2$ at 2θ of 37.4° and the intensity of the peak of the (110) plane of $LiCoO_2$ at 2θ of 66.4° increased as the intensity of the magnetic field increased.

Figure 4:
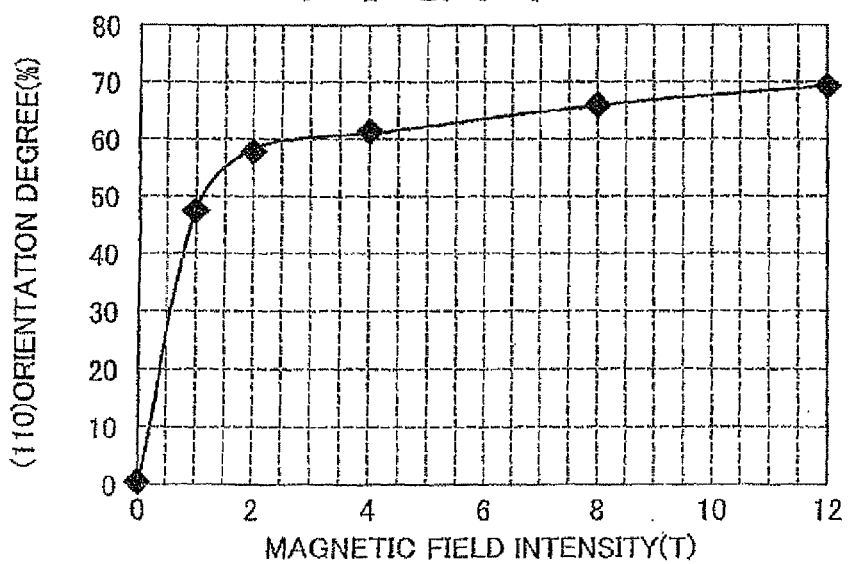
FIG. 4 is a graph showing a relation between a magnetic field intensity and the degree of orientation.

FIG. 4 is a graph showing the relation between the intensity of the magnetic field and the degree of orientation, based on the results obtained from the XRD patterns in FIG. 3. In the graph of FIG. 4, an ordinate axis indicates the degree (%) of orientation of the (110) plane of $LiCoO_2$, and an abscissa axis indicates the magnetic field intensity (T). The method of calculating the degree of orientation is as follows. The degree P (%) of orientation of the particles is calculated based on the X-ray diffraction peak intensity $I_{003}$ of the (003) plane at an angle 0° with respect to the c-plane, and the X-ray diffraction peak intensity $I_{110}$ of the (110) plane at an angle of 90° with respect to the c-plane, using the following formula (3).

$$P=\{I_{110}/(I_{003}+I_{110})\}\times 100 \quad (3)$$

As evident from FIG. 4, in the case where the magnetic field intensity was 0 T when the electrode was produced, the (110) orientation degree was 0.7%. The (110) orientation degree increased, as the intensity of the magnetic field increased. In the case where the intensity of the magnetic field was 12 T when the electrode was produced, the (110) orientation degree was 68.8%. This indicates that the degree of orientation of the crystals of $LiCoO_2$ is increased by applying the magnetic field with a high intensity when the electrode is produced.

4. Comparison of Discharge Characteristics of Coin Batteries

Each of the coin batteries in the sixth example, the second comparative example, and the third comparative example was charged with electric current and electric current was discharged from each of the coin batteries in three cycles, as pre-conditioning charging/discharging. In each cycle, each of the coin batteries was charged with electric current at 0.5 C until the voltage reaches 4.2 V, and electric current was discharged from each of the coin batteries until the voltage reaches 3.0 V. Then, after each of the coin batteries was charged until the State of Charge (SOC) reaches 100%, the impedance was measured, and the discharge characteristic of each of the coin batteries was evaluated. In the method of evaluating the discharge characteristic, each of the coin batteries was charged with electric current at 1 C, and the discharge current was changed from ⅓ C to 1 C, 2 C, 3 C, 5 C, and 10 C. Table 1 shows the results.

TABLE 1

| Discharge current | Sixth example (mAh/g) | Second comparative example (mAh/g) | Third comparative example (mAh/g) |
|---|---|---|---|
| 1/3 C | 140 | — | 138 |
| 1 C | 131 | 133 | 114 |
| 2 C | 122 | 126 | 95 |
| 3 C | 121 | 124 | 69 |
| 5 C | 117 | 120 | 38 |
| 10 C | 105 | 50 | 5 |

As shown in Table 1, in the battery in the third comparative example, the discharge capacity density was sharply decreased by increasing the discharge current. The discharge capacity density was 5 mAh/g on the condition that the discharge current was 10 C. It is considered that because the scale-shaped particles of the positive electrode active material, which had a high aspect ratio, were used in the battery in the third comparative example, a crack occurred in the positive electrode active material layer when the particles of the positive electrode active material were rotated and orientated by applying the magnetic field, and thus, the discharge characteristic of the battery was decreased. In contrast, in the battery in the second comparative example, although the discharge capacity density was kept stable on the condition that the discharge current was 1 C to 5 C, the discharge capacity density on the condition that the discharge current was 10 C was 50 mAh/g that was lower than a half of the discharge capacity density on the condition that the discharge current was 1 C to 5 C. It is considered that because electrons and ions were slowly conducted, and resistance was large, the voltage reached a lower limit voltage in an initial stage, that is, a stage where discharging had not been sufficiently performed. In contrast to the batteries in the second and third comparative examples, in the battery in the sixth example, the discharge capacity density was kept stable on the condition that the discharge current was ⅓ C to 10 C, and particularly, the discharge capacity density was 105 mAh/g that was high on the condition that the discharge current was 10 C. This is because the crystals in the positive electrode active material particles were oriented in the direction in which lithium ions and electros were easily conducted, by applying the strong magnetic field, and thus, the discharge characteristic of the battery in the sixth example was increased.

What is claimed is:

1. A production method for an electrode for a lithium secondary battery, comprising:
   preparing a conductive substrate, and lithium cobaltate particles; and
   producing an electrode by attaching the lithium cobaltate particles onto the conductive substrate, and applying a magnetic field in a direction substantially parallel to the conductive substrate, an intensity of the magnetic field being equal to or higher than 12 T.

2. The production method according to claim 1, wherein an aspect ratio of each of the lithium cobaltate particles is equal to or higher than 1.0 and lower than 5.0.

3. The production method according to claim 2, wherein the aspect ratio of each of the lithium cobaltate particles is equal to or higher than 1.0 and lower than 2.5.

4. The production method according to claim 1, wherein in producing the electrode, after the lithium cobaltate particles are dispersed in a dispersion medium, the dispersion medium, in which the lithium cobaltate particles are dispersed, is applied to the conductive substrate so that the lithium cobaltate particles are attached onto the conductive substrate.

* * * * *